United States Patent [19]
Hodge

[11] Patent Number: 5,146,532
[45] Date of Patent: Sep. 8, 1992

[54] OPTICAL FIBER RETENTION DEVICE

[75] Inventor: Ronald L. Hodge, Lawrenceville, Ga.

[73] Assignee: Scientific-Atlanta, Inc., Norcross, Ga.

[21] Appl. No.: 616,277

[22] Filed: Nov. 20, 1990

[51] Int. Cl.⁵ ............................................. G02B 6/36
[52] U.S. Cl. .................................... 385/136; 385/135
[58] Field of Search ................ 350/96.2, 96.21, 96.22; 385/114, 86, 87, 135, 136, 147

[56] References Cited

U.S. PATENT DOCUMENTS

| | | | |
|---|---|---|---|
| 4,088,386 | 5/1978 | Hawk | 350/96.21 |
| 4,102,561 | 7/1978 | Hawk et al. | 350/96.21 |
| 4,142,776 | 3/1979 | Cherin et al. | 350/96.21 |
| 4,147,404 | 4/1979 | Hensel | 350/96.21 |
| 4,247,163 | 1/1981 | Lumpp et al. | 350/96.21 |
| 4,253,730 | 3/1981 | Logan et al. | 350/96.21 |
| 4,254,865 | 3/1981 | Pacey et al. | 350/96.21 |
| 4,359,262 | 11/1982 | Dolan | 350/96.2 |
| 4,427,879 | 1/1984 | Becher et al. | 250/215 |
| 4,489,830 | 12/1984 | Charlebois et al. | 350/96.21 X |
| 4,588,257 | 5/1986 | Maranto | 350/96.21 |
| 4,708,430 | 11/1987 | Donaldson et al. | 350/96.2 |
| 4,719,321 | 1/1988 | Kozel et al. | 174/135 |
| 4,753,515 | 6/1988 | Sato et al. | 350/96.22 X |
| 4,773,726 | 9/1988 | Ito | 350/96.2 |
| 4,911,662 | 3/1990 | Debortoli et al. | 439/719 |
| 4,923,275 | 5/1990 | Kaukeinen | 350/96.24 |

Primary Examiner—John D. Lee
Assistant Examiner—John Ngo
Attorney, Agent, or Firm—William A. Marvin

[57] ABSTRACT

An optical fiber retention device which is adapted to positively locate and retain one or more optical fibers while providing strain-relief. The optical fiber retention device includes a pair of resilient strip members which snap fit together to positively restrain the optical fibers between them. The strip members include a base strip having one or more generally U-shaped channels which support individual optical fibers in a common plane. The other strip member comprises a top member which includes two resilient keys which snap fit into resilient keyways in the base member. The top member has an elongated generally rectangular surface which retains the optical fibers in the channels for strain relief. The base member additionally includes a pair of resilient keys which snap fit into the keyways of other base members to allow the base member to be stacked on one another for tiers or racks of support channels and to allow mounting on a plate of a termination or branch box.

15 Claims, 2 Drawing Sheets

OPTICAL FIBER RETENTION DEVICE

FIELD OF THE INVENTION

The invention pertains generally to retention devices for providing locational stability, restraint, and strain-relief and is more particularly directed to such retention devices for optical fibers.

BACKGROUND OF THE INVENTION

In the cable television (CATV) industry, there are extensive runs of optical fiber cable. These optical fibers can be in single or multiple strands along trunks and feeder lines. Such optical fiber strands must be restrained and channeled to prevent their damage and to provide a solid base for termination, branching or connection. When there is a termination or a branch of these fibers, such as at a feeder to a group of subscribers or at the end of a trunk, the fibers must be located at a relatively fixed position to facilitate their connection. Further, they should be located and retained positively so that they can be identified easily and not kink or break. In conjunction with this restraint, the fibers should be strain-relieved so that the mechanical flexions on another portion of the fiber strand does not break a termination.

Many techniques for optical fiber restraint and strain-relief have been used but most are expensive and cumbersome. The restraints for optical fibers should be relatively strong, easy to install, and inexpensive.

SUMMARY OF THE INVENTION

The invention provides an optical fiber retention device which is adapted to positively locate and retain one or more optical fibers while providing strain-relief. The optical fiber retention device includes a pair of resilient strip members which snap together to positively restrain the optical fibers between them. The strip members include a base strip having one or more generally U-shaped channels which support individual optical fibers in a common plane. The other strip member comprises a top member which includes two resilient keys which snap fit into resilient keyways in the base member. The top member has an elongated generally rectangular surface which retains the optical fibers in the channels and provides strain relief.

The keys, which snap fit into the resilient keyways of the base member, comprise posts of generally square cross-section having wedge-shaped heads. The keyways of the base member are reciprocally shaped to the keys and provide either a sliding or snap fit for the combination.

As an additional feature, the base member includes a pair of keys that snap fit into the keyways of other base members. Because of this feature, the base members can be stacked on one another to form tiers or racks of support channels. The bottom surface of each base member becomes the restraining or top member for the base member below. Moreover, when the base member is provided with these keys, it can be mounted to a mounting plate of a termination or branch box. This is done by the simple expediency of providing apertures which act as keyways in the plate. The keys are flexibly inserted in the apertures and hold the base member in place with the wedged-shaped heads of the posts.

The base and top members are preferably manufactured from a resilient material, such as ABS plastic or the like, which allows flexure for the snap fit. Because the retention device comprises only two members, a single design for each member can be reproduced in bulk very inexpensively. This reproduction can be accomplished by conventional thermoplastic injection molding techniques, or the similar techniques. The retention device, in accordance with the objects of the invention, is inexpensive to produce, provides positive retention and strain relief, and facilitates assembly and maintenance of the optical fiber cable plant.

These and other objects, features, and aspects of the invention will be more fully understood and better described when the following detailed description is read in conjunction with the appended drawings wherein:

DETAILED DESCRIPTION OF THE PREFERRED EMBODIMENTS

Figure 1:
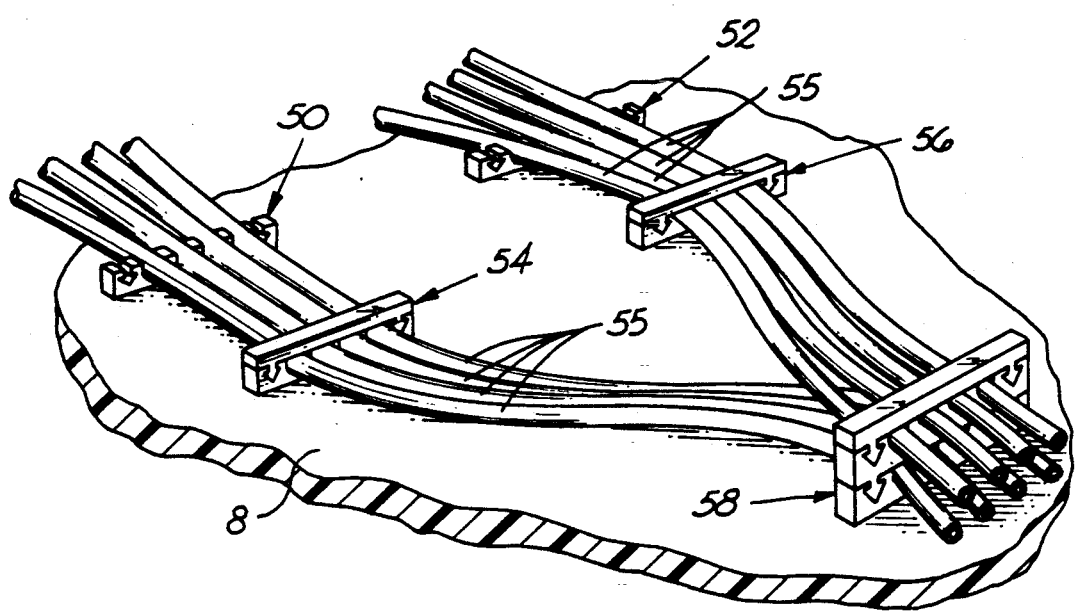
FIG. 1 is a partially-sectioned pictorial perspective view of a termination box for a fiber optic trunk which includes several fiber optic retention devices, constructed in accordance with the invention, mounted on a plate therein.

With reference to FIG. 1, there is illustrated several assemblies of an optical fiber retention device constructed in accordance with the invention. The assemblies are the combination of the optical fiber retention device, in several embodiments, which are mounted on a plate 8. Assemblies 50, 52 illustrate one use of the optical fiber retention device for the separation and location of optical fiber strands 55. Assemblies 54, 56 illustrate another use where multiple optical fiber strands 55 are positively located, restrained and strain-relieved. Assembly 58 illustrates still another use where tiers or racks of optical fiber strands 55 are concentrated.

The mounting plate 8 which can be plastic, metal, or any other suitable material can be an integral part of an enclosure for cable equipment or a separate mountable plate used only for optical fiber routing. The plate 8 and assemblies can be used in CATV systems in the headend transmitter section, trunk or bridger amplifiers, receivers, etc. In other words, anywhere an optical fiber would need to be positively located or restrained. Further, it is evident that the utilization of the invention can be broader than CATV systems and includes communications systems in general, or the like.

Figure 3:
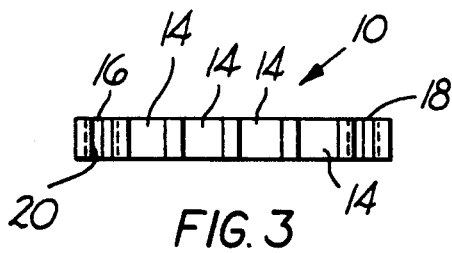
FIG. 3 is a top view of the base member of the fiber optic retention device illustrated in FIG. 1.
Figure 6:
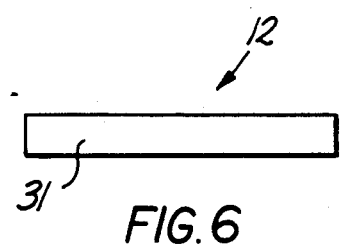
FIG. 6 is a top view of the top member of the fiber optic retent device illustrated in FIG. 1.
Figure 4:
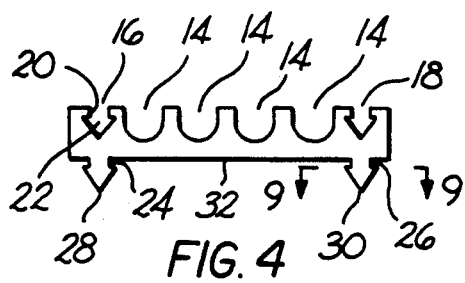
FIG. 4 is a side view of the base member of the fiber optic device illustrated in FIG. 3.
Figure 7:
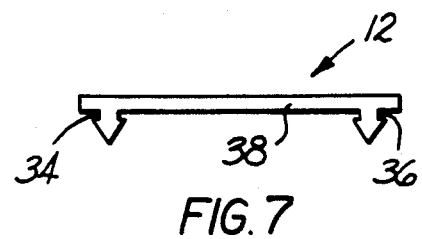
FIG. 7 is a side view of the top member illustrated in FIG. 6.
Figure 5:
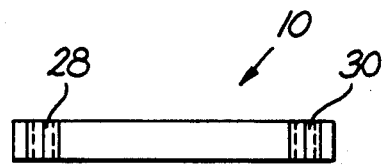
FIG. 5 is a bottom view of the base member of the fiber optic retention device illustrated in FIG. 3.
Figure 8:
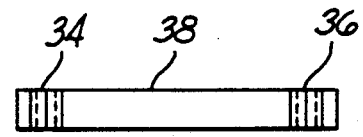
FIG. 8 is a bottom view of the top member illustrated in FIG. 6.

The optical fiber retention device, in one embodiment, includes a base member 10 and a top member 12. The base member 10 is more fully illustrated in top, side, and bottom views in FIGS. 3–5, respectively. The top member 12 is more fully illustrated in top, side, and bottom views in FIGS. 6–8, respectively.

The base member 10 includes a plurality of U-shaped channels 14, which provide support and locational stability for an optical fiber strand. The base member 10 may have one or more of these U-shaped channels paralleled across a support section which holds a plurality of optical fibers in a generally parallel plane. The width of each channel 14 is such that the optical fiber 55 just fits within the channel sidewalls. Preferably, the channels are about 0.020 of an inch greater than the diameter of the optical fiber to be retained. The channels 14 can be varied to fit any size of optical fiber 55. Because the base member 10 is made from a resilient flexible material, this will produce a snug fit for the optical fibers in the channel without breakage or substantial compressive forces on the fibers.

Located on either side of this support segment are integrally formed keyways 16 and 18. Each keyway, for example 16, has a generally rectangular slot 20 which expands into a triangular trough 22. Also, integrally formed with the base member 10 are a pair of keys having posts 24 and 26 which are terminated with wedged-shaped heads 28 and 30, respectively. The wedged-shaped heads 28 and 30 substantially mate with the keyways 16 and 18 to produce a snap fit with locking capability.

Figure 9:
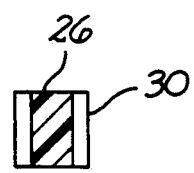
FIG. 9 is a cross-sectional view of one of the posts illustrated in FIG. 4 taken along section lines 9—9 in that figure.

Each key, for example 26, as better seen in FIG. 9, has a post of generally square cross-section which ends in a wedged-shaped head 30 which is substantially triangular in cross-section. The length of each post is substantially that of the channel 20 of each keyway so that, when the posts are snapped into the keyways, a flat surface 32 on the bottom of the support section will retain any optical fibers in the channels 14 of the base member below.

Similarly, the top member 12 is generally a rectangular strip including a flat top surface 31 and keys 34 and 36 which are shaped substantially identical to keys 28 and 30. Keys 34 and 36 mate with keyways 16 and 18 of the base member 10 in the same way that the keys of the base member do. The surface 38 which spans the posts 34 and 36 will retain optical fibers in the channels 14 of the base member 10 when the top member 12 is snapped into the keyways 16 and 18 of the base member.

The base member 10 and top member 12 are preferably manufactured for a resilient material, such as ABS plastic, or the like. The resiliency allows flexure of the device for snap fitting the keys into the keyways. Because the retention device comprises only two members, a single design for each member can be reproduced in bulk very inexpensively. This reproduction can be accomplished by conventional thermoplastic injection molding techniques, or similar techniques.

Figure 2:
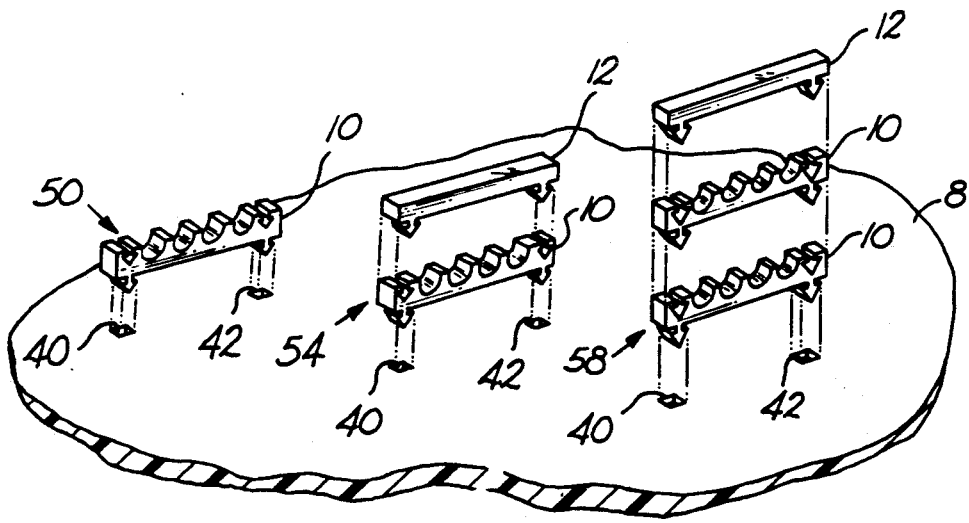
FIG. 2 is a pictorial perspective view of the assembly of the fiber optic retention devices illustrated in FIG. 1.

In this manner, as better illustrated in FIG. 2, a substantially flexible optical fiber retention assembly can be produced by first snap fitting a base member 10 into apertures 40 and 42 of a plate 8. The apertures 40, 42 are shown as square to form an interference fit with the wedge shaped heads of the keys. If, however, the apertures are round, or some other shape, positive mounting of the device will still result. The depth of the apertures can be such that the head does not go all the way through, or alternatively that they do. For mounting the base member 10 on a plastic plate 8, square apertures are preferred. For mounting the base member 10 on a metal plate 8, round apertures are preferred. The head of the key will extend beyond the aperture and retain the base member with its flat edges (see FIG. 12).

If a single retention assembly is to be provided, then a top member 12 may be snap fitted onto the base member 10. Alternatively, racks or tiers of the base member 10 can be built up by snap fitting several together and then finished by snap fitting a top member 12 on. Because of the shape of the keys and keyways, an alternative to the snap fit is to slide the keys in laterally. This may be the choice if top access is restricted.

Figure 10:
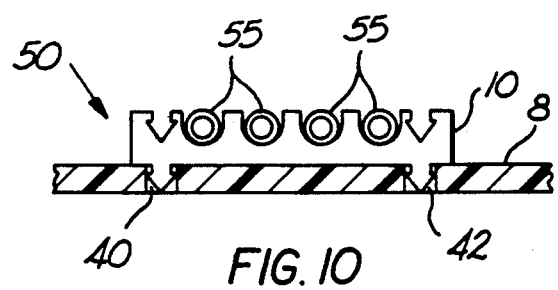
FIG. 10 is a partially cross-sectioned side view of the assembly 50 illustrated in FIG. 1.
Figure 11:
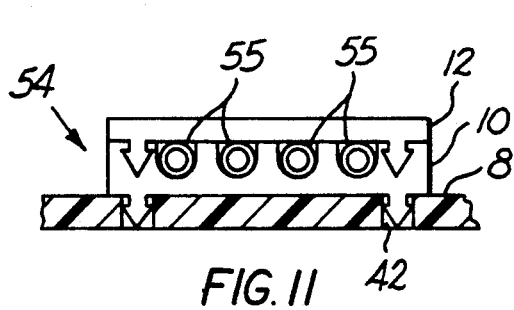
FIG. 11 is a partially cross-sectioned side view of the assembly 54 illustrated in FIG. 1.
Figure 12:
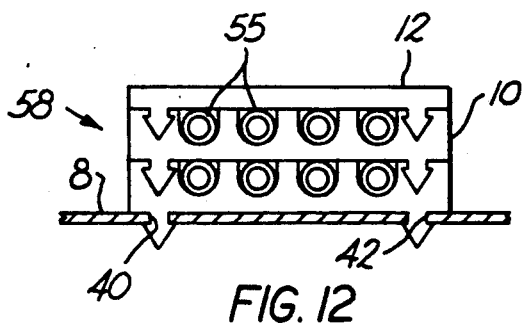
FIG. 12 is a partially cross-sectioned side view of the assembly 58 illustrated in FIG. 1.

This produces considerable latitude in the use of the optical fiber retention device wherein different assemblies can be utilized. Returning to FIG. 1, if a separation of the optical fibers without a restraint is required, then assemblies 50 and 52 can be used to provide this function. FIG. 10 illustrates a frontal view of assembly 50. Alternatively, if positive retention and strain-relief are to be provided to a single row of optical fibers, then assemblies 54 and 56 can be used for this function. FIG. 11 illustrates a frontal view of assembly 54. Still alternatively, if racks or tiers of optical fibers are necessary for concentrating strands, then assembly 58 can be used. FIG. 12 illustrates a front view of assembly 58.

While the preferred embodiments of the invention have been shown and described, it will be obvious to those skilled in the art that various modifications and changes can be made to the invention without departing from the spirit and scope of the invention as hereinafter defined in the appended claims.

What is claimed is:

1. An optical fiber retention device for positively locating, retaining, and strain-relieving optical fiber strands, said retention device comprising:
   a base member integrally formed of a resilient material and including a substantially strip-shaped support section having one or more generally U-shaped support channels;
   a cover member integrally formed of a resilient material and having a substantially strip-shaped covering section; and
   means for resiliently locking said cover member to said base member such that the optical fiber strands are positively located by said channels, and retained and strain-relieved by said cover member, wherein said means for resiliently locking said cover member to said base member are integrally formed in at least one of said cover member and said base member.

2. An optical fiber retention device as set forth in claim 1 wherein said means for resiliently locking said cover member to said base member further include:
   an integrally formed keyway in said base member;
   an integrally formed key in said cover member; and
   wherein said key is adapted to resiliently snap fit into said keyway.

3. An optical fiber retention device as set forth in claim 2 wherein said keyway includes:
   a generally rectangular channel connected to a generally triangular trough.

4. An optical fiber retention device as set forth in claim 3 wherein said key includes:

a generally rectangular post connected to a generally wedge-shaped head.

5. An optical fiber retention device as set forth in claim 1 wherein said means for resiliently locking said base member to said cover member further include:
an integrally formed keyway in said cover member;
an integrally formed key in said base member; and
wherein said key is adapted to resiliently snap fit into said keyway.

6. An optical fiber retention device as set forth in claim 5 wherein said keyway includes:
a generally rectangular channel connected to a generally triangular trough.

7. An optical fiber retention device as set forth in claim 6 wherein said key includes:
a generally rectangular post connected to a generally wedge-shaped head.

8. An optical fiber retention device as set forth in claim 1 wherein said base member further includes:
mounting means integrally formed with said base member for mounting said base member to a mounting plate.

9. An optical fiber retention device as set forth in claim 8 wherein said mounting means further include:
a key which is adapted to snap fit into an aperture of said plate.

10. An optical fiber retention device as set forth in claim 9 wherein said key further includes:
a generally rectangular post connected to a generally wedge-shaped head.

11. An optical fiber retention device as set forth in claim 9 wherein:
said key is adapted to snap fit into said keyway.

12. An optical fiber retention device for positively locating, retaining and strain-relieving optical fiber strands, said retention device comprising:
a base member integrally formed of a resilient material and including a substantially strip-shaped support section having one or more generally U-shaped support channels; at least two keyways, one at each end of said support section, each keyway formed as a generally rectangular channel connected to a generally rectangular trough; and at least two keys, one at each end of said support section aligned with said keyways, each key formed as a generally rectangular post connected to a generally wedge-shaped head; and
wherein said keys are adapted to snap fit into apertures of a mounting plate.

13. An optical fiber retention device as set forth in claim 12 which further includes:
a cover member formed from a resilient material and having a substantially strip-shaped covering section; and at least two keys, one at each end of said covering section, each key formed as a generally rectangular post connected to a generally wedge-shaped head; and
wherein said keys are adapted to snap fit into said keyways.

14. An optical fiber retention device for positively locating and strain-relieving optical fiber strands, said retention device comprising:
a plurality of base members, each base member integrally formed of a resilient material and including a substantially strip-shaped support section having one or more generally U-shaped support channels; at least two keyways, one at each end of said support section, each keyway formed as a generally rectangular channel connected to a generally rectangular trough; and at least keys, one at each end of said support section aligned with said keyways, each key formed as a generally rectangular post connected to a generally wedge-shaped head; and
wherein said keys are adapted to snap fit into apertures of a mounting plate and adapted to snap fit into said keyways.

15. An optical fiber retention device as set forth in claim 14 which further includes:
a cover member formed from a resilient material and having a substantially strip-shaped covering section; and at least two keys, one at each end of said covering section, each key formed as a generally rectangular post connected to a generally wedge-shaped head; and
wherein said keys are adapted to snap fit into said keyways.

* * * * *